April 21, 1931.　　　S. G. DOWN　　　1,801,908
MAGNETIC BRAKE DEVICE
Filed Feb. 19, 1930
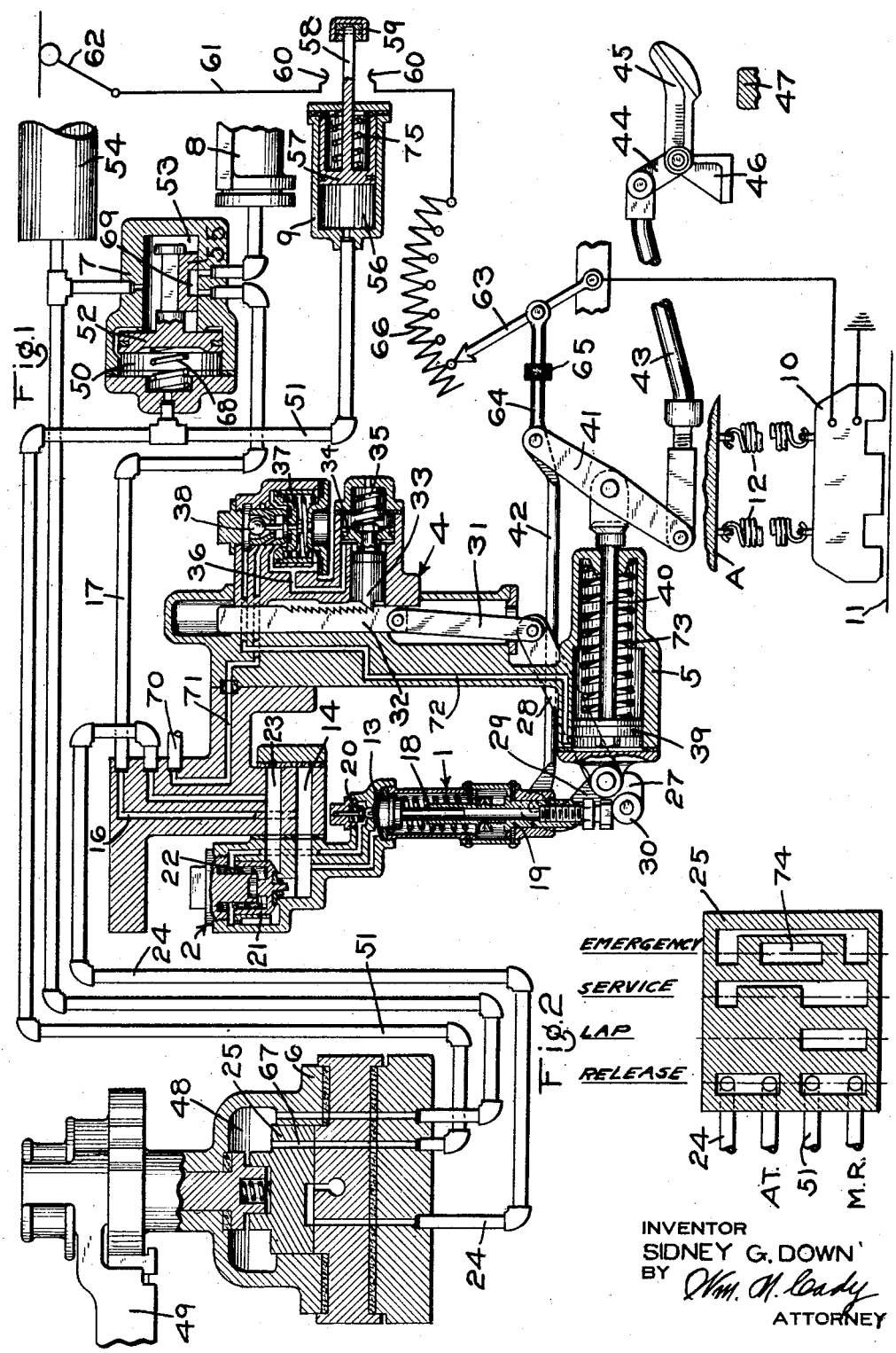
INVENTOR
SIDNEY G. DOWN
BY
Wm. H. Cady
ATTORNEY Patented Apr. 21, 1931

1,801,908

UNITED STATES PATENT OFFICE

SIDNEY G. DOWN, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

MAGNETIC BRAKE DEVICE

Application filed February 19, 1930. Serial No. 429,609.

This invention relates to magnetic brakes of the type employing a magnetic brake shoe adapted to engage the rail.

One object of my invention is to provide a magnetic brake apparatus in which the magnetic pull of the brake is varied according to the load on the vehicle and in which the magnetic brake is operative only upon effecting an emergency application of the brakes.

Another object of my invention is to provide a combined fluid pressure brake and a magnetic brake in which the fluid pressure brakes are applied with the magnetic brakes in an emergency application of the brakes, and in which the magnetic brake is applied with a force proportional to the load on the vehicle.

Other objects and advantages will appear in the following more detailed description of the invention.

In the accompanying drawing; Fig. 1 is a diagrammatic view, partly in section, of a combined fluid pressure and magnetic brake equipment embodying my invention; and Fig. 2 a diagram showing the connections made in the various positions of the brake valve device.

As shown in the drawing, the equipment may comprise a device for regulating the brake cylinder pressure according to the load on the vehicle, including a brake cylinder pressure limiting valve device 1, a brake cylinder supply valve device 2, a locking mechanism 4, and a strut cylinder 5.

The equipment also comprises a brake valve device 6, an emergency valve device 7, a brake cylinder 8, a fluid pressure switch device 9, and a magnetic brake shoe 10 suspended above the rail 11 at opposite sides of the vehicle by springs 12, which are secured to a portion A of the car truck.

The valve device 1 comprises a flexible diaphragm 13, which is subject on one side to brake cylinder pressure in chamber 14, which is connected to the brake cylinder 8 through passage 16 and pipe 17, and on the opposite side to the pressure of an adjustable coil spring 18. The pressure of spring 18 is adjusted by means of a plunger device 19. The diaphragm 13 is adapted to operate a valve 20 for controlling the operation of the brake cylinder supply valve device 2.

The brake cylinder supply valve device 2 comprises a valve piston 21, subject on one side to the pressure of a spring 22 and adapted to control the supply of fluid under pressure from chamber 23 to chamber 14. The chamber 23 is connected to a pipe 24, which leads to the seat of the rotary valve 25 of the brake valve device 6.

Pivotally mounted on the cup plate 26 of the strut cylinder 5 is a crank arm member having crank arms 27, 28 and 29. A roller 30 carried by the arm 27 is adapted to engage the lower end of the plunger device 19 for effecting the adjustment of spring 18 to correspond with the load on the car.

The arm 28 is connected by link 31 to a ratchet bar 32, slidably mounted in the casing of the locking mechanism 4, and a pawl 33 is adapted to engage the teeth of the ratchet bar, the pawl 33 being operatively connected to a piston 34, which piston is subject on one side to the pressure of spring 35 and on the opposite side to fluid under pressure as supplied through passage 36.

The supply of fluid to passage 36 is controlled by a valve piston 37 and a check valve 38 adapted to be operated by said piston. The strut cylinder 5 contains a piston 39 having a stem 40 which is pivotally connected to a lever 41.

One end of the lever 41 is pivotally connected to one end of a rod 42, the other end of the rod being pivotally connected to the arm 29. The other end of lever 41 is pivotally connected to a rod 43. A crank, having arms 44 and 45, is pivotally mounted on a bracket 46, which is secured to some portion of the car body. The arm 44 is pivotally connected to rod 43, and the arm 45 is adapted, upon a clockwise movement, to engage a member 47 mounted on the car truck (not shown).

The brake valve device 6 comprises a casing having a valve chamber 48 containing a rotary valve 25 adapted to be operated by a handle 49. The emergency valve device 7 comprises a casing having a piston chamber 50, connected to an emergency brake pipe 51, and containing a piston 52 and having a valve chamber 53, connected to a source of fluid under pressure, such as the main reservoir 54, and containing a slide valve 55, adapted to be operated by piston 52.

The switch device 9 comprises a casing having a piston chamber 56, containing a piston 57 and connected to the brake pipe 51. The piston 57 is provided with a stem 58 carrying a switch member 59, adapted to bridge contacts 60 in a wire 61 which is connected to the trolley 62, or other source of current, and through which current is supplied to the track shoe 10.

A pivoted contact arm 63 is pivotally connected to a rod 64, which rod is operatively connected to one end of the lever 41, a section 65 of insulating material being interposed in the rod 64 to insulate the arm 63 from the lever 41. When the arm 63 is rotated, it engages contacts associated with a variable resistance unit 66, so as to vary the resistance in the magnetic brake shoe circuit.

In operation, with the brake valve device 6 in release position, fluid under pressure is supplied through port 67 in the rotary valve 25 to the emergency brake pipe 51, so that said brake pipe is normally maintained charged with fluid under pressure and the emergency piston 52 is maintained in the position shown in the drawing by spring 68. Fluid under pressure in the brake pipe 51 is also supplied to piston chamber 56, so that the switch piston 57 is maintained in its outer position, with the switch member 59 out of engagement with the contacts 60. The current supply circuit to the brake shoe 10 is thus maintained open, so long as the pressure in the emergency brake pipe 51 is maintained.

With the piston 52 in normal position, as shown in the drawing, a cavity 69 in slide valve 55 establishes communication through pipe 17 to the brake cylinder 8.

The mechanism for varying the brake cylinder pressure according to the load on the car is similar to that disclosed in prior patents, such as in Patent No. 1,572,196 of C. C. Farmer, issued February 9, 1926, and operates as follows:

When the car is brought to a stop and the car doors are opened, fluid under pressure is supplied through pipe 70 to passage 71, and flows past the unseated check valve 38 to passage 72 and thence to the strut cylinder 5.

The pressure of fluid supplied to the strut cylinder 5 also acts on valve piston 37, and when the pressure has been increased to a predetermined degree, the valve piston 37 is moved downwardly, so as to open communication from passage 71 to passage 36. Fluid under pressure is then supplied to piston 34, so that said piston is operated to release the pawl 33 from engagement with the teeth of the ratchet bar 32.

When the pressure of fluid supplied to the strut cylinder 5 has been increased sufficiently to overcome the pressure of spring 73, the piston 39 is moved outwardly, first causing the arm 45 to engage the member 47. The end of the rod 43 connected to the lever 41 then acts as a fulcrum for said lever, and further movement of the lever 41 depends upon the relative position of the member 47 associated with the car truck, with respect to the position of the bracket 46 which is movable with the car body.

As the load on the car is increased, the lever 41 is rotated in a clockwise direction, so that the rod 42 is pulled toward the right. This operates the arm 27 of the bell crank, so that the plunger device 19 is moved upwardly to compress the spring 18 in proportion to the load on the car. The arm 28 is also shifted a corresponding amount, the ratchet bar 32 being moved with the arm 28. When the car has been loaded and the car doors are closed, fluid under pressure is released from pipe 70 and passage 71, so that piston 34 is moved by spring 35 into locking engagement with the ratchet bar 32. The bell crank and its associated arms 27, 28 and 29 are then locked in their adjusted positions.

The movement of lever 41 by the increase in the load on the car also operates to move the contact arm 63 toward the right in proportion to the increase in the load, and a corresponding amount of resistance is cut out so that the greater the load on the car, the less the amount of resistance in the brake shoe circuit, and the greater the current flow to the brake shoe.

When the brakes are applied in service by operation of the brake valve device 6, fluid under pressure is supplied to pipe 24 and chamber 23 and acting on the valve piston 21, so that said valve piston is unseated to permit flow of fluid under pressure from chamber 23 to chamber 14 and thence through passage 16 and pipe 17, and through cavity 69 in slide valve 55 to the brake cylinder 8.

The pressure of fluid supplied to the brake cylinder also acts on diaphragm 13 and when the pressure has been increased to a degree slightly exceeding the pressure of spring 18, as previously adjusted according to the load on the car, the diaphragm 13 is deflected, so as to allow the valve 20 to seat. The fluid pressures on opposite sides of the valve piston 21 then equalize, permitting the spring 22 to move the valve piston to its seat, cutting off the further supply of fluid under pressure to the brake cylinder.

In effecting a service application of the brakes, it will be noted that the magnetic brake remains inactive, since the switch member 59 is held in open position by the emergency brake pipe pressure acting on piston 57, so that current is not supplied to the magnetic brake shoe 10.

When the brake valve handle 49 is turned to emergency position, to effect an emergency application of the brakes, fluid under pressure is vented from the brake pipe 51 to the atmosphere, through a cavity 74 in the rotary valve 25. The emergency piston 52 is then shifted to emergency position by the reduction in brake pipe pressure, in which slide valve 55 is shifted so that valve chamber 53 is connected with the port leading to the brake cylinder 8. Fluid under pressure is thereupon supplied from valve chamber 53 and the main reservoir 54 to the brake cylinder 8 to effect an emergency application of the brakes.

The venting of fluid from the emergency brake pipe 51 also permits the switch piston 57 to be shifted to the left by spring 75, so that the switch member 59 is moved to close the circuit through contacts 60. Current is then supplied to the brake shoe 10 which is energized to cause the brake shoe to exert magnetic force with respect to the rail, the force of which is dependent upon the amount of resistance cut into the circuit as determined by the position of the contact arm 63, the position of said arm being in turn dependent upon the load on the car, as hereinbefore described.

It will thus be seen that with the improved braking apparatus, when a fluid pressure emergency application of the brakes is effected, the magnetic brake will be applied in proportion to the load on the car.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. The combination with a fluid pressure brake apparatus and mechanism for regulating the fluid braking power according to the load on the car, of a magnetic brake shoe and means controlled by said mechanism for regulating the amount of current supplied to energize said brake shoe.

2. In a car brake apparatus, the combination with a brake cylinder and mechanism operated according to the load on the car for regulating the pressure of fluid supplied to said brake cylinder, of a magnetic brake shoe and means operated by said mechanism for regulating the current supplied to energize said brake shoe.

3. In a car brake apparatus, the combination with a brake cylinder, means for regulating the pressure of fluid supplied to the brake cylinder, a lever for operating said means, and means controlled according to the load on the car for operating said lever, of a magnetic brake shoe and means operatively connected to said lever for varying the resistance in the magnetic brake shoe circuit according to the load on the car.

In testimony whereof I have hereunto set my hand, this 18th day of February, 1930.

SIDNEY G. DOWN.